Figure 1:
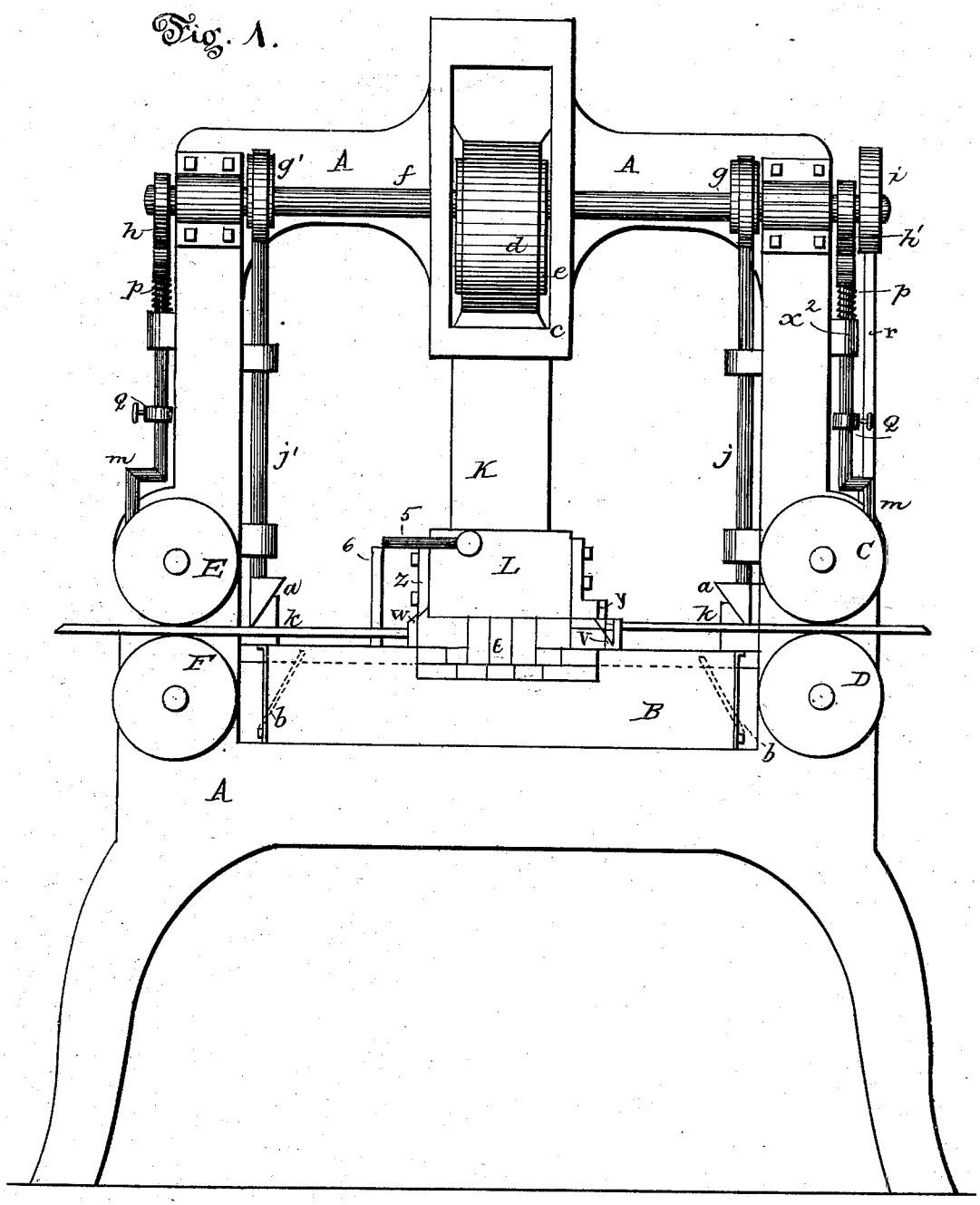

(No Model.) 3 Sheets—Sheet 1.

R. ELLWOOD & A. J. UPHAM.
MACHINE FOR MANUFACTURING BARBED FENCING.

No. 278,523. Patented May 29, 1883.

WITNESSES:
Fred. G. Dieterich.
J. G. Hinkel.

INVENTOR.
Reuben Ellwood
Andrew J. Upham
By Allen Webster
ATTORNEY

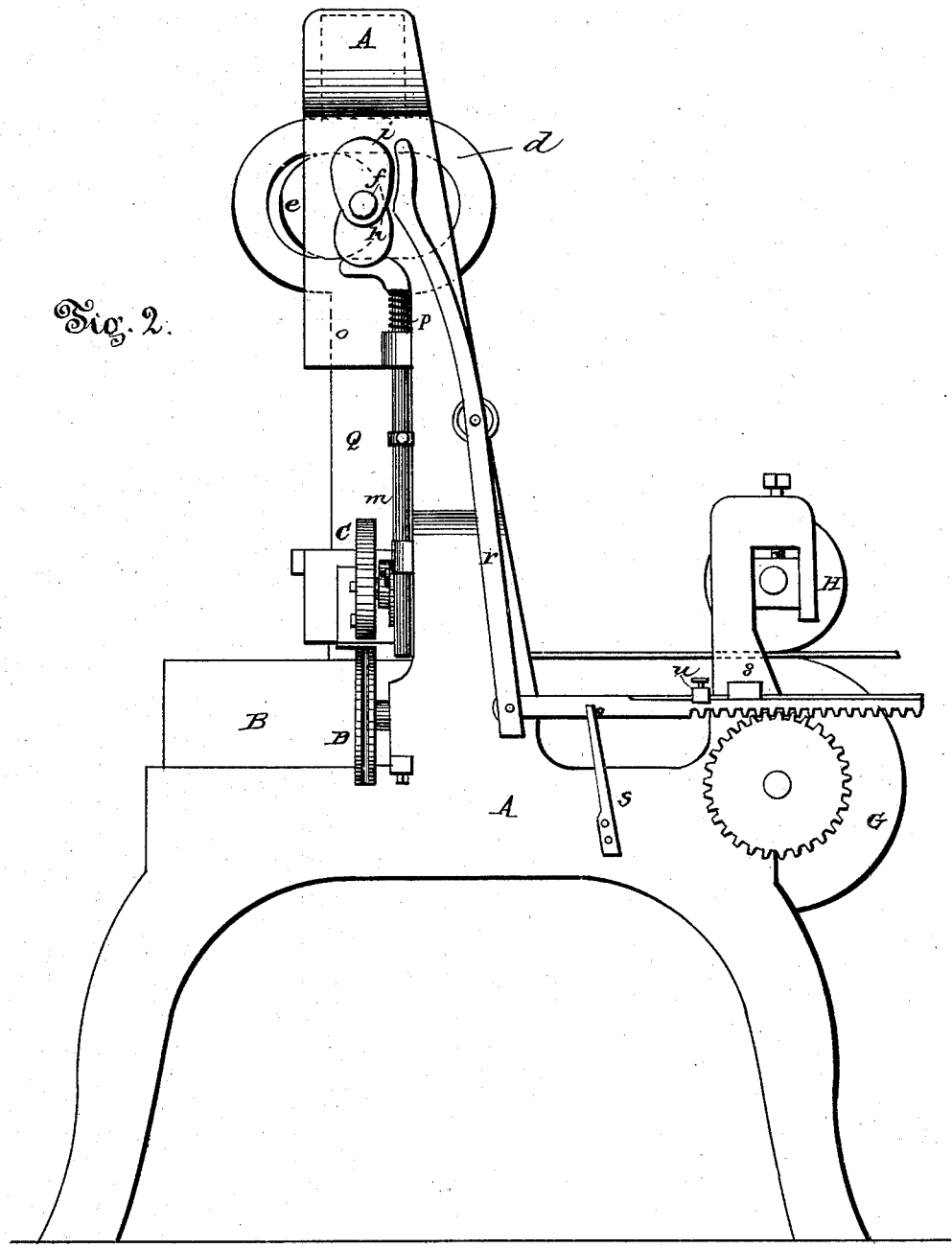

(No Model.) 3 Sheets—Sheet 3.
R. ELLWOOD & A. J. UPHAM.
MACHINE FOR MANUFACTURING BARBED FENCING.
No. 278,523. Patented May 29, 1883.
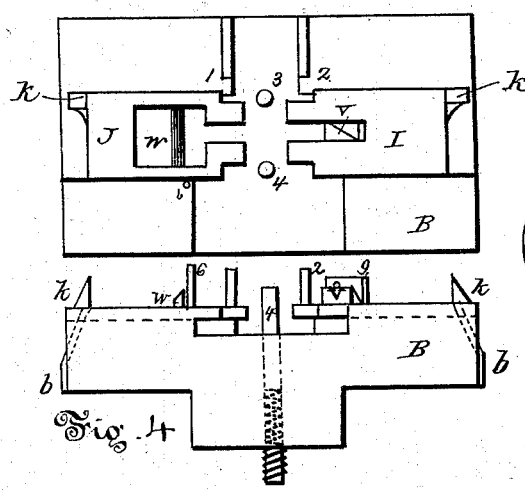
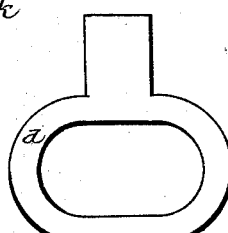
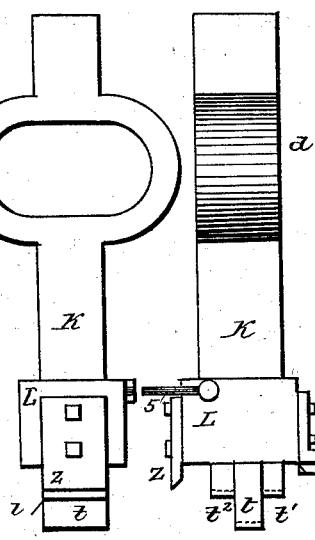
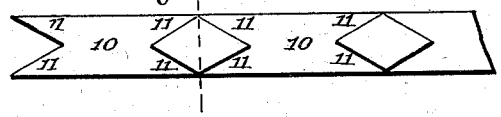
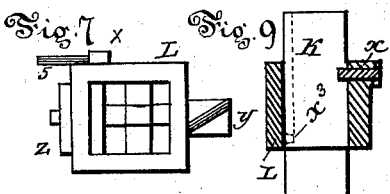
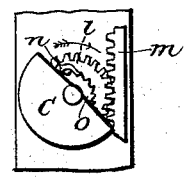
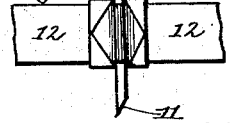
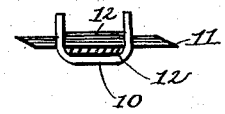
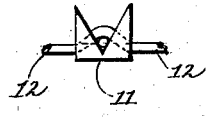
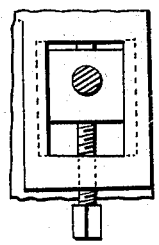
WITNESSES:
Fred. G. Dieterich.
J. G. Hinkel.
INVENTOR.
Reuben Ellwood
Andrew J. Upham
By Allen Webster
ATTORNEY

UNITED STATES PATENT OFFICE.

REUBEN ELLWOOD AND ANDREW J. UPHAM, OF SYCAMORE, ILLINOIS; SAID UPHAM ASSIGNOR TO SAID ELLWOOD.

MACHINE FOR MANUFACTURING BARBED FENCING.

SPECIFICATION forming part of Letters Patent No. 278,523, dated May 29, 1883.

Application filed November 22, 1882. (No model.)

*To all whom it may concern:*

Be it known that we, REUBEN ELLWOOD and ANDREW J. UPHAM, both of Sycamore, in the county of De Kalb and State of Illinois, have jointly invented new and useful Improvements in Machines for the Manufacture of Barbed Fencing, of which the following is a specification, reference being had to the accompanying drawings, in—which similar letters of reference indicating like parts—

Figure 1 is a front view of a machine devised by us, adapted to perform the several requisite operations in the manufacture of barbed wire. Fig. 2 is a side view of the same. Fig. 3 is a top view of the lower die and parts connected therewith, and Fig. 4 is a side view of the same. Figs. 5, 6, and 7 are side and end views of the upper die-head, and Figs. 8 and 9 are views of parts of the same in section. Fig. 10 is a view of the feeding device, part of the feed-wheel being broken away. Fig. 11 is a view of the binding-pieces as they appear in a continuous strip. Figs. 12 and 13 are views of a section of fencing, showing one of the positions of the binder during the operation of manufacture. Fig. 14 is a side view of a section of completed fencing, and Fig. 15 is a view of the portion of the frame to which the auxiliary feed-wheels are attached.

The object of our invention is to provide a machine for manufacturing barbed fencing, in which the barbs are fastened to the main strand by binding-pieces which are fed in a continuous strip, the barb material being fed in the same manner, and to provide a means of automatically performing the several requisite operations. The means provided by us for accomplishing these objects is that illustrated in the drawings, and herein described.

A represents a frame having a bed on which the part B rests.

C D represent feed-wheels having suitable bearings on the frame and arranged to feed the wire to the dies. E and F are similar wheels located on the opposite side of the frame, and arranged to feed the binders in a continuous strip, and G H are feed-wheels located in the rear of the frame and adapted to feed the main strip to the dies as it may be required.

The part B has sliding pieces I and J, which are moved to and from the center of the die by wedge-shaped pieces $a$ and springs $b$. The die-head K moves in the part $c$ of the frame, and is moved by the eccentric or cam $e$, which revolves in the yoke $d$. The cam $e$ is fixed to the shaft $f$, which has bearings in the frame, as shown. This shaft is also provided with eccentrics $g$ and $g'$, which eccentrics give motion to the rods $j$ and $j'$, whose lower ends are provided with the wedge-shaped pieces $a$. These pieces operate on like pieces, $k$, which are attached to the sliding pieces I and J, so that a downward motion of the rods $j j'$ will force these sliding pieces toward the center of the part B. The feeding device consists of two wheels between which the material to be fed is held. A view of one of the feed-operating devices is shown in Fig. 10, with part of the feed-wheel broken away. The feed-wheel is provided with a ratchet-wheel, $o$, which is fixed to and revolves with it. A tooth-wheel, $l$, revolves on the same shaft with the feed-wheel, and is provided with a pawl, $n$, which engages with the teeth of the ratchet-wheel $o$, and thus moves the ratchet and feed wheel in the same direction. The wheel $l$ is caused to revolve by a downward motion of the rack $m$. An upward movement of the rack $m$ will revolve the wheel $l$ back to its first position without affecting the position of the feed and ratchet wheels. Thus an intermittent feed is provided, the time of the operation and the length of the throw of which may be varied by varying the position of the cams $h$ on the shaft and the position of the collars $q$ on the rods $m$. The rack-rods $m$ are forced downward by the action of the cams $h$, and are returned to their position by the action of springs $p$. By varying the position of the collars $q$ on the rods $m$ the return motion of these rods may be varied, and the feed be thus regulated. For instance, if the position of the collar on the rod be varied so that the collar will strike against the bearing or part $x^2$ and prevent the rod moving upward as far as the cam would permit it to move, then the length of the throw of the rod $m$ will be equal to the extreme distance the collar is moved from the part $x^2$, the length of throw being shortened by moving the collar toward the part $x^2$. It will be seen that the distance of revolution of the feed-wheels will be decreased as the distance of the motion of the rods $m$ is decreased, and that the time at which the feed ceases action will always be the same—

*i. e.*, at the instant the cams *h* are in the position shown in the drawings. The feed for the main strand operates in the same manner, excepting that a lever, *r*, is used to communicate the motion of cam *i* to the rack. A spring, *s*, returns the rack to its first position, and an adjustable slide, *u*, regulates the length of the throw by being moved to and from the piece I, against which it strikes on the return motion.

The auxiliary feed-wheels H, F, and D are adjustable to and from their mates by moving the part on which they have bearings toward or from the main or principal feed-wheels. This is done by turning the set-screw shown in Fig. 15. The feeding device may thus be varied to permit material of varying thickness being used.

The die-head K has the die *t*, which is held in position by a spring, as shown in Fig. 8, until forced within the die-head or body of the die by the action of the machine.

The part B has a cutting-piece, *v*, arranged at the proper distance from the center and standing at an angle, as shown, for the purpose of cutting the barb from the wire at the proper time and leaving it pointed. Upon the other side of the part B is the cutter *w*, located as shown, for the purpose of cutting the binders from the strip.

Cutting-edges *y* and *z*, which register with the cutting-edges *v* and *w*, are attached to the part L, which part slides on the part K during a portion of the operation of attaching the binder 10 to the main strand 12.

The pin *x* has a cam or wedge shaped head, which, when slightly turned, will draw the pin from the recess in the part K, and thus permit the part L to move upon the part K.

The operation is as follows: The main strand 12, being fed by the feed-wheels H and G, will move from the rear of the machine toward its front and over the recessed portion of the part B, suitable guides, 1 2, holding the same in proper position. The pins 3 4, resting on springs, hold the main strand 12 above the binder 10 and barb 11 until pressed downward by the action of the descending dies. The binder 10 is fed toward the center by the feed-wheels E and F, and passes over the cutter *w*, stopping at a point over the edge of the cutter, as indicated in dotted lines in Fig. 11. The wire 11 for the barb is fed by the feed-wheels C and D, and, passing through a proper guide, is fed directly over the cutter *v*. If now, all the materials being in position, as above described, the shaft *f* continues to revolve, the cam moving on the yoke *d* will force the die-head K downward, and the die *t*, first coming in contact with the main strand 12, will bear downward with a slight pressure, sufficient, however, to prevent a disarrangement or movement of the parts when the cutters operate. As the die-head K continues to move downward, the face of the die *t* retains its relative position on the strand, and the coil-spring which forces it outward is compressed. The part L, having the cutters secured to it in position, as shown, remains locked to the die-head K until the operation of cutting has been performed, at which point the lever 5 comes in contact with a piece, 6, and the cam-pin *x* is turned sufficiently to release it from the die-head K; hence the die-head K can continue its downward motion without carrying the part L with it. During the time of the above-described operation the slides I and J retain the position shown in Fig. 2. The upper die, now continuing to move downward, will have compressed the spring *b* until its tension is sufficient to force the main strand, barb, and binder to the bottom of the recess in part B, the binder being bent to the position shown in Figs. 12 and 13, the barb will pass through the openings in the sliding pieces, and the strand will pass between their ends. At this time the eccentrics *g* and *g'* will move the rods *j j'* downward, and, through the medium of the wedge-shape pieces *a*, bearing against like-shaped pieces, *k*, will force the slides I and J toward the center, and thus fold the ends of the binder over the strand in the position shown in Fig. 14. After turning these ends in, as stated, the slides immediately return to the first position, and the upper die compresses the parts firmly together. At the time of the final pressing, the shoulders of the die *t* will have bearing against the shoulders of the die-head K, and its face will be flush with the remainder of the die-face $t'$ and $t^2$. The faces of these dies are grooved to conform to the shape to which the main strand is to be bent over the barb, thus permitting the sides of the dies to perform the final operation of compressing the binder. A suitable projection, $x^3$, on the part L projects into a groove on the die-head, which terminates at the point the part L is to be fixed to the die-head, thus preventing the part L sliding below the desired point. The material will of course be fed to the machine in the same relative position as when the fencing is complete—that is to say, the binding-piece will be at the bottom, the barb in the center, and the main strand at the top. It will be noticed that the illustration is out of proportion, the dies and parts directly attached being nearly working size, while the other working parts and frame are very much smaller than will be used in a working-machine. Cams of various shapes may be used to give the desired motion. Binders of various other shapes may be used in a like manner, they being made in a continuous strip. These may be stamped with a suitable die attached to and operating with the machine, or prepared and fed as herein shown.

Having therefore described our invention, what we claim, and desire to secure by Letters Patent, is—

1. In a machine for the manufacture of barbed fencing, the die-head K, having dies $t\ t'\ t^2$, and the part B, having parts I and J, all adapted to operate substantially as described.

2. In a machine for the manufacture of barbed fencing, the die-head K, provided with dies $t\ t'\ t^2$, and part L, adapted to slide on the die-head K, and provided with a means whereby it is automatically secured to and released from the die-head K, and provided with cutters $z$ and $y$, and part B, provided with cutters $w$ and $v$, all constructed and operating substantially as shown.

3. In a machine for the manufacture of barbed fencing, the combination of a means to feed the main strand, the wire for the barb, and the binding material, each being operated independent of the other, a means to cut the wire for the barb and for the binding material, operating as shown, a part, B, having sliding pieces I and J, a means to move the slide, and a die-head, K, having dies $t\ t'\ t^2$, all adapted to operate substantially as shown.

4. In a machine for the manufacture of barbed fencing, a part, B, having pieces I and J, in combination with a die-head, K, having dies $t\ t'\ t^2$, and adapted to force the material between the pieces I and J, a means to move the slides, and a means to cut the material, all adapted to operate substantially as shown.

5. In a machine for the manufacture of barbed fencing, the combination of a feed-wheel, $c$, having ratchet-wheel $o$, wheel $l$, having pawl $n$, adapted to engage with the ratchet-wheel, a rack, $m$, provided with a spring, $p$, and stop $e$, a shaft, $f$, having a cam, $i$, and an auxiliary feed-wheel, all combined and operating substantially as shown.

6. In a machine for manufacturing barbed fencing, the combination of a die-head, K, provided with dies $t\ t'\ t^2$, and having a part, L, adapted to slide thereon, the part L being provided with cutters $z$ and $y$, a part, B, having parts I and J, adapted to move, as shown, cutters $v$ and $w$, a means to feed the material to be operated upon, and a means to communicate motion to the parts K, I, and J, all constructed and operating substantially as shown.

REUBEN ELLWOOD.
ANDREW J. UPHAM.

Witnesses:
J. W. WALROD,
W. H. BATES.